US012775653B2

(12) United States Patent
Goyal et al.

(10) Patent No.: US 12,775,653 B2
(45) Date of Patent: Oct. 27, 2026

(54) GENERATIVE AI SEARCH FORMATS

(71) Applicant: GOOGLE LLC, Mountain View, CA (US)

(72) Inventors: Bhavika Goyal, Readwood City, CA (US); Senthil Hariramasamy, Mountain View, CA (US); Timothy Benjamin Whalin, Seattle, WA (US); Hanny Kamal, Seattle, WA (US); Ethan Milo Mann, Sunnyvale, CA (US); Chester Ee Paul Lian, Sunnyvale, CA (US)

(73) Assignee: GOOGLE LLC, Mountain View, CA (US)

( * ) Notice: Subject to any disclaimer, the term of this patent is extended or adjusted under 35 U.S.C. 154(b) by 0 days.

(21) Appl. No.: 19/253,350

(22) Filed: Jun. 27, 2025

(65) Prior Publication Data

US 2026/0003902 A1 Jan. 1, 2026

Related U.S. Application Data

(60) Provisional application No. 63/666,342, filed on Jul. 1, 2024.

(51) Int. Cl.

*G06F 16/338* (2019.01)
*G06F 16/35* (2025.01)
*G06Q 30/0241* (2023.01)

(52) U.S. Cl.

CPC ............ *G06F 16/338* (2019.01); *G06F 16/35* (2019.01); *G06Q 30/0241* (2013.01)

(58) Field of Classification Search

CPC .... G06F 16/338; G06F 16/35; G06Q 30/0241
See application file for complete search history.

(56) References Cited

U.S. PATENT DOCUMENTS 5,855,015 A * 12/1998 Shoham .............. G06F 16/3326 707/999.005
7,076,443 B1 * 7/2006 Emens ............... G06Q 30/0257 705/26.8

(Continued)

OTHER PUBLICATIONS

Amazon Ads, "Using multiple ad types together to help drive brand growth," (2025).

(Continued)

*Primary Examiner* — Jorge A Casanova
(74) *Attorney, Agent, or Firm* — MARSHALL, GERSTEIN & BORUN LLP

(57) ABSTRACT

Systems and methods for providing information responsive to a user search are provided. Such a method includes receiving a search query from a client device and generating a plurality of categories associated with the search query using a first artificial intelligence (AI) model. The method also includes selecting a plurality of sponsored content options that are responsive to the search query and, for each category, generating respective freeform descriptive text for the category using a second AI model. The method also includes causing the client device to present a user interface that includes (i) the respective freeform descriptive text for each category and (ii) links to third party information resources associated with the selected plurality of sponsored content options. An arrangement of the links within the user interface indicates which of the plurality of sponsored content options correspond to which of the plurality of categories.

20 Claims, 6 Drawing Sheets

(56) References Cited

U.S. PATENT DOCUMENTS

| | | | | |
|---|---|---|---|---|
| 8,886,636 | B2 | 11/2014 | Gabrilovich et al. | |
| 9,461,876 | B2 | 10/2016 | Van Dusen et al. | |
| 9,595,048 | B2 * | 3/2017 | Wu | G06F 16/24575 |
| 11,593,415 | B1 * | 2/2023 | Anderson | G06F 16/3326 |
| 2008/0177708 | A1 * | 7/2008 | Ayyar | G06F 16/951 707/999.102 |
| 2010/0146380 | A1 | 6/2010 | Rousso et al. | |
| 2014/0032529 | A1 * | 1/2014 | Chang | G06F 16/248 707/722 |
| 2016/0012482 | A1 * | 1/2016 | Doubleday | G06Q 30/0259 705/14.54 |
| 2017/0316085 | A1 * | 11/2017 | Gupta | G06F 16/243 |
| 2018/0075150 | A1 * | 3/2018 | Rezaei | G06F 16/9535 |
| 2023/0135553 | A1 | 5/2023 | Cella et al. | |
| 2024/0256582 | A1 * | 8/2024 | Jain | G06F 16/3329 |
| 2025/0217423 | A1 * | 7/2025 | Pattabhiraman | G06F 16/9532 |

OTHER PUBLICATIONS

Feize, “Online Advertisements wtih LLMs: Opportunities and Challenges,” (2024).
Google Ads Editor Help, “Add new ad groups,” (2025).
Meta, “About carousel ads,” (2025).

* cited by examiner

GENERATIVE AI SEARCH FORMATS

CROSS-REFERENCE TO RELATED APPLICATIONS

This application claims priority to and the benefit of the filing date of provisional U.S. Patent Application No. 63/666,342 entitled "GENERATIVE AI SEARCH FORMATS," filed on Jul. 1, 2024. The entire contents of the provisional application are hereby expressly incorporated herein by reference.

FIELD OF TECHNOLOGY

The present disclosure relates to search queries and, more specifically, to techniques for generating, formatting, and serving content responsive to search queries.

BACKGROUND

The background description provided herein is for the purpose of generally presenting the context of the disclosure. Work of the presently named inventor(s), to the extent it is described in this background section, as well as aspects of the description that may not otherwise qualify as prior art at the time of filing, are neither expressly nor impliedly admitted as prior art against the present disclosure.

Current techniques for providing content to users seeking information (e.g., via a search engine) are often insufficient to orient the users to complex or unfamiliar solution spaces. In particular, it can be difficult for a user to quickly or easily understand the precise relevance or applicability of third party content (e.g., digital advertisements) that is served/presented in response to the user's search query. This in turn can lead to the user entering repeated and increasingly complex searches, which unnecessarily wastes both processing resources of the system and time for the user, while also frustrating the user and making the user more likely to abandon a search entirely. Similarly, current techniques for providing responsive content to users fail to (1) support the user's articulation of complex needs without overly and artificially narrowing the user's search, and (2) accurately match the user's intent. Again, these problems can lead to repeated and/or increasingly complex searches, the unnecessary use of processing resources and time, and user frustration or abandonment. Moreover, the aforesaid problems can result in degradation of various performance metrics associated with third party content (e.g., measurable impression rates, click-through rates, conversion rates, etc.).

SUMMARY

In one example implementation, a computer-implemented method for providing information responsive to a user search includes: (i) receiving, by one or more processors of a computing system, a search query from a client device; (ii) generating, by the one or more processors, a plurality of categories associated with the search query using a first artificial intelligence (AI) model; (iii) selecting, by the one or more processors, a plurality of sponsored content options that are responsive to the search query; (iv) for each category of the plurality of categories, generating, by the one or more processors, respective freeform descriptive text for the category using a second AI model; and (v) causing, by the one or more processors, the client device to present a user interface that includes (A) the respective freeform descriptive text for each category of the plurality of categories, and (b) links to third party information resources associated with the selected plurality of sponsored content options. An arrangement of the links within the user interface indicates which of the plurality of sponsored content options correspond to which of the plurality of categories

DETAILED DESCRIPTION OF THE DRAWINGS

Figure 1:
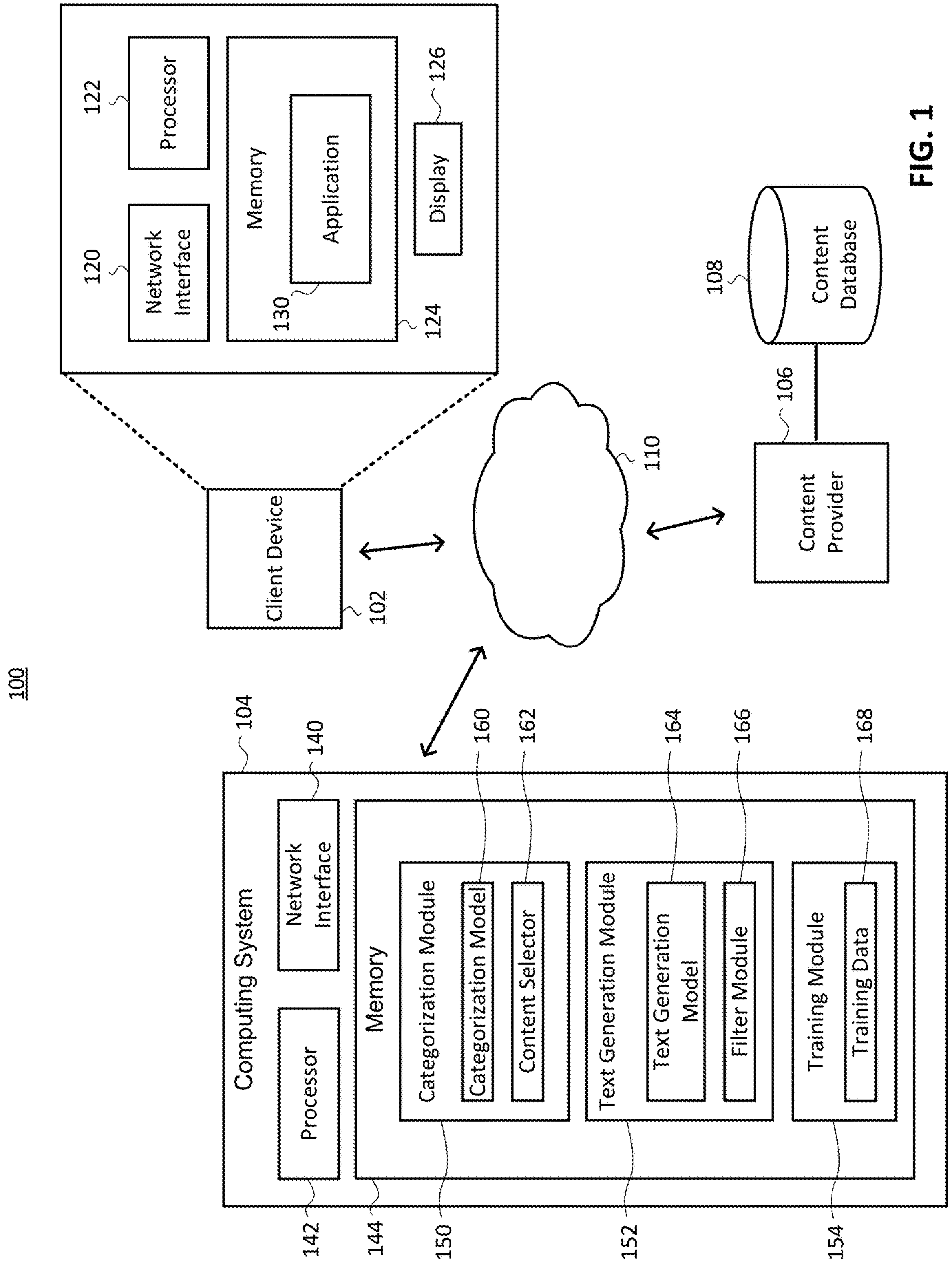
FIG. 1 is a block diagram of an example system in which techniques of the present disclosure can be implemented.

By using artificial intelligence (AI) models, including a large language model (LLM) or other generative AI model, a computing system (e.g., one or more servers) generates one or more categories (e.g., commercial categories, usage categories, etc.) responsive to receiving a search query from a user. In various implementations, the computing system may generate the categories based on the search query (and possibly other signals) before selecting sponsored content options for each category, or may first select the sponsored content options responsive to the search query and use the selected sponsored content options to inform the generation of categories (e.g., by clustering retrieved third party content associated with the sponsored content options).

Moreover, by using an AI model, the computing system can generate freeform descriptive text (e.g., a relatively short, natural language text summary) for each category based on the category itself, and possibly also based on third party information resources such as landing pages associated with selected sponsored content options. In this manner, the computing system can generate an easily understood, intuitively organized summary that clearly presents the user with categories related to the search query, and clearly indicates how different sponsored content options fit within those different categories.

In some implementations, the computing system indicates how different sponsored content options fit within the different categories by including inline links (e.g., hypertext links to URLs) within the freeform descriptive text of particular categories. For a particular category, for example, the freeform descriptive text may briefly describe the category and available products or services that may be helpful in the context of that category, and within the latter portion include certain highlighted words associated with different sponsored content options (e.g., company names, brand names, product names, etc.). A user selection of (e.g., click on) any such highlighted word may then cause the client device (e.g., a web browser) to direct the user to a landing page associated with the respective sponsored content option, for example.

Alternatively, the computing system may indicate how different sponsored content options fit within the different categories by generating the freeform descriptive text so as to have different portions (e.g., different sentences or paragraphs, etc.) each dedicated entirely to a different sponsored content option. In this implementation, the computing system may cause the client device to present the different text portions as content items that are selectable in their entireties, e.g., such that when the user clicks on any portion of a box or other graphical element containing the text for a specific sponsored content option, the client device (e.g., web browser) directs the user to a landing page associated with that sponsored content option. In some of these implementations, the computing system can additionally generate introductory descriptive text for each category that provides a broad description of the category to further guide users.

In either of the above implementations, the computing system may filter language of the freeform descriptive text by modifying (e.g., removing) restricted language. For example, the computing system may detect and modify promotional words by changing the promotional words to neutral words (e.g., replacing " . . . provides the best solution . . . " with " . . . provides a solution . . . "). In this manner, the computing system can more concisely and clearly provide information to users, reduce user confusion, and/or reduce the number of searches and/or amount of processing required while maintaining a relatively neutral and authentic description for the benefit of users.

FIG. 1 illustrates an example system 100 in which the techniques disclosed herein may be implemented. The example system 100 includes a client device 102, a computing system 104, a content provider 106 (e.g., a computing device or system of a content provider entity), a content database 108, and a network 110. The computing system 104 in some implementations is remote from the client device 102 and/or content provider 106, and communicatively coupled to the client device 102 and/or content provider 106 via the network 110. It will be understood that system 100 is exemplary, and that other systems may include additional, fewer, or alternative components (e.g., training module 154 may be omitted). Similarly, arrangements of the components of system 100 may be modified. For example, some elements of system 100 may be combined, split apart, swapped, etc.

The network 110 may be a single communication network (e.g., the Internet), and in some implementations also includes one or more additional networks. As an example, the network 110 may include a cellular network, the Internet, and a server-side local area network (LAN). While FIG. 1 shows only a single client device 102, content provider 106, and content database 108, it will be understood that the system 100 may include any suitable number of similar client devices, content providers, and/or content databases operating according to the principles disclosed herein.

Generally, the client device 102 is generally configured to access information resources (e.g., web pages, application user interfaces, etc.) that may be supplied or published by the computing system 104, content providers (e.g., content provider 106), and/or other entities, and the computing system 104 is generally configured to generate categories and freeform text descriptions to be served to the client device 102 along with links to information resources (e.g., landing pages) associated with sponsored content options. As used herein, "sponsored content" may refer to advertisement/marketing content, or any other type of content that is provided by and/or otherwise associated with a third party (e.g., a party other than an entity associated with the computing system 104 of FIG. 1). The information resources, and/or content items (e.g., digital advertisements) associated with the information resources, may be stored in content databases such as content database 108. In other implementations, the content database 108 is instead a part of the computing system 104 (e.g., if third parties supply such content for local storage at computing system 104, or if computing system generates content on behalf of third parties, etc.).

The client device 102 may be or include any stationary, mobile, or portable computing device with wired and/or wireless communication capability (e.g., a smartphone, a tablet computer, a laptop computer, a desktop computer, a smart wearable device such as smart glasses or a smart watch, a vehicle head unit computer, etc.). In the example implementation of FIG. 1, the client device 102 includes a network interface 120, a processor 122, memory 124, and a display 126. The processor 122 may be a single processor (e.g., a central processing unit (CPU)), or may include a set of processors (e.g., multiple CPUs, or one or more CPUs and one or more graphics processing units (GPUs)).

The memory 124 includes one or more computer-readable, non-transitory storage units or devices, which may include persistent (e.g., hard disk) and/or non-persistent memory components. The memory 124 stores instructions that are executable by the processor 122 to perform various operations, including the instructions of various software applications and the data generated and/or used by such applications. In the example implementation of FIG. 1, the memory 124 stores at least an application 130, which may be, for example, a web browser application, a mobile application downloaded from an application store, or a video player application.

Generally, application 130 is executed by processor 122 to present information resources and/or image data to the user of the client device 102 via the display 126 (and/or one or more speakers of the client device 102, not shown in FIG. 1). In an implementation where the application 130 is a web browser application, for instance, an information resource may be a web page hosted by a publisher or the content provider 106, with the web browser causing the client device 102 to download HyperText Markup Language (HTML), scripts, and/or other code of the web page for presentation to a user via the display 126.

The display 126 includes hardware, firmware, and/or software configured to enable a user to view visual outputs of the client device 102, and may use any suitable display technology (e.g., LED, OLED, LCD, etc.). In some implementations, the display 126 is incorporated in a touchscreen having both display and manual input capabilities. Moreover, in some implementations where the client device 102 is a wearable device, the display 126 is a transparent viewing component (e.g., lenses of smart glasses) with integrated electronic components. For example, the display 126 may include micro-LED or OLED electronics embedded in lenses of smart glasses.

The network interface 120 includes hardware, firmware, and/or software configured to enable the client device 102 to exchange electronic data with the computing system 104 via the network 110. For example, the network interface 120 may include a cellular communication transceiver, a Wi-Fi transceiver, and/or transceivers for one or more other wired and/or wireless communication technologies.

While FIG. 1 shows client device 102 as a single component communicating directly (i.e., via network 110) with the computing system 104, in some implementations the subcomponents of client device 102 shown in FIG. 1 are instead divided among two or more user-side devices. As just one example, a pair of smart glasses may include the processor 122, the memory 124, and the display 126, while a smartphone may include another processing unit, another memory, another display, and the network interface 120. The smart glasses (or smart helmet, etc.) may then communicate as needed with the smartphone (e.g., via Bluetooth) to enable the operations described herein.

The computing system 104 includes a network interface 140, a processor 142, and memory 144. The network interface 140 includes hardware, firmware, and/or software configured to enable the computing system 104 to exchange electronic data with the client device 102 and other, similar client devices via the network 110. For example, the network interface 140 may include a wired or wireless router and a modem. The processor 142 may be a single processor, may include two or more processors, etc. The computing system 104 may include one or more servers, for example, which may reside at a single location or multiple locations.

The memory 144 is a computer-readable, non-transitory storage unit or device, or collection of units/devices that may include persistent and/or non-persistent memory components. The memory 144 stores the instructions of a categorization module 150, a text generation module 152, and a training module 154, each of which may be executed by the processor 142. In the example system 100, the categorization module 150 includes (or remotely accesses) a categorization model 160 and includes a content selector 162. The text generation module 152 includes (or remotely accesses) a text generation model 164 and includes a filter module 166. The training module 154 uses training data 168 to train one or more machine learning models (e.g., categorization model 160 and/or text generation model 164). In some implementations, some of the software modules/units shown in FIG. 1 are omitted. For example, the text generation module 152 may omit the filter module 166, or the computing system 104 may omit training module 154 (e.g., if the training is done by a different computing system). The categorization model 160 and/or the text generation model 164 may be an LLM or other suitable generative AI model. As another example, the text generation model 164 may be an LLM while the categorization model 160 is a non-LLM classification neural network.

The categorization module 150, text generation module 152, and training module 154 may be software modules comprising instructions executed by the processor 142 to perform the various operations described herein. It is understood, however, that other architectures are also possible (e.g., with functionality of modules 150 and 152 being provided by a single software module, or with functionality of module 150 being split among a plurality of software modules, and so on).

Generally, the categorization module 150 uses a categorization model 160 to generate a number of categories responsive to receiving a search query from a user, and selects (via content selector 162) different sponsored content options to present in connection with the different categories. For example, the categorization model 160 may receive the query "how to replace a pixel 4XL screen" and generate related categories such as "phone repair services" and/or "DIY screen replacement", and content selector 162 may select one or more sponsored content options to include under each category heading. In some implementations, the categorization module 150 generates the categories prior to content selector 162 selecting any particular sponsored content options, based on the search query alone or the search query with one or more other signals (e.g., user inputs). The content selector 162 may then select sponsored content options associated with each category (e.g., based on tags associated with third party content items or information resources associated with the sponsored content options, by classifying such third party content items or information resources using another AI model, and/or by using one or more other suitable techniques).

In other implementations, the categorization module 150 generates the categories based on sponsored content options that are first selected by content selector 162 in response to the search query. For example, content selector 162 may respond to the search query by pulling third party content (e.g., content items or landing pages) relevant to the search query using any suitable selection techniques (e.g., relevance scores, keyword matching, auctions based on bid amounts, etc.), after which categorization model 160 clusters the third party content into categories using any suitable clustering technique (e.g., by analyzing semantic and/or images of the third party content, etc.).

In some implementations (e.g., where the categorization model 160 is an LLM), the categorization model 160 generates the categories not only by operating on the inputs noted above (e.g., the search query alone, or the search query plus retrieved content and/or other signals), but also by operating on a text prompt. The text prompt may be generated and/or tuned by another model, a prompt generated and/or tuned by the training module 154 using historical data, a manually generated prompt, or a prompt generated in any other suitable manner. Additional signals that the categorization model 160 can use to generate categories may include, for example, an indication of an area of interest (commercial, personal, etc.), an indication of a price range, an indication of a geographical location, and/or other suitable signals.

In some implementations, the text generation module 152 uses the text generation model 164 to generate freeform descriptive text (e.g., summaries) of the generated categories, with links for the sponsored content options selected by content selector 162 being included inline in the descriptive text. For example, if categorization module 150 generates a Category A and a Category B, and if content selector identifies Sponsored Content Option 1 and Sponsored Content Option 2 for Category A and Sponsored Content Option 3 for Category B, text generation module 152 may generate a descriptive text summary of Category A that includes inline links to Sponsored Content Option 1 and Sponsored Content Option 2, and also generate a descriptive text summary of Category B that includes an inline link to Sponsored Content Option 3. The links may be URL hyperlinks, for example, and may be visually represented as highlighted (e.g., bolded, underlined, and/or differently colored) words associated with the respective sponsored content options (e.g., company names, brand names, product names, service names, etc.). Computing system 104 may cause the client device 102 to present the freeform descriptive text with links via application 130 and display 126, e.g., by transmitting the freeform descriptive text with links to client device 102 via network 110. When a user of client device 102 selects (e.g., clicks on) a given link, the application 130 may access an information resource (e.g., web page) associated with the respective sponsored content option, and cause the display 126 to present the information resource to the user.

In other implementations, the text generation module 152 uses the text generation model 164 to generate different portions of freeform descriptive text that are each specific to a particular sponsored content option, e.g., with each link for a sponsored content option being associated with the entirety of the descriptive text for that sponsored content option. For example, if categorization module 150 generates a Category A and a Category B, and if content selector identifies Sponsored Content Option 1 and Sponsored Content Option 2 for Category A and Sponsored Content Option 3 for Category B, text generation module 152 may generate, under a Category A heading, a first descriptive text summary for the products or services of Sponsored Content Option 1 and a distinct, second descriptive text summary for the products or services of Sponsored Content Option 2, and further generate, under a Category B heading, a third descriptive text summary for the products or services of Sponsored Content Option 3. The links may be URL hyperlinks, for example, and may be visually represented as graphical elements (e.g., rectangles, shaded areas, etc.) that encompass/include the generated freeform descriptive text for the respective sponsored content option, or in another suitable manner. In some implementations, the text generation module 152 also generates introductory descriptive text for each category (e.g., without links), to provide further guidance to the user. Computing system 104 may cause the client device 102 to present the freeform descriptive text with links via application 130 and display 126, e.g., by transmitting the freeform descriptive text with links to client device 102 via network 110. When a user of client device 102 selects a given link (e.g., by clicking on an associated graphical element, or more specifically by clicking on the text itself, etc.), the application 130 may access an information resource (e.g., web page) associated with the respective sponsored content option, and cause the display 126 to present the information resource to the user.

In some implementations, the text generation module 152 uses a filter module 166 to process freeform descriptive text before computing system 104 serves/transmits the freeform descriptive text and links (and possibly introductory descriptive text as discussed above) to the client device 102. For example, the filter module 166 may remove promotional, unintuitive, obscene, or otherwise restricted language and possibly replace the restricted language with acceptable language. (e.g., replacing or removing promotional terms such as “popular”, “best”, etc.). In some implementations, the filter module 166 removes such language (e.g., using a dedicated filtering model) after text generation module 152 generates the freeform descriptive text and/or introductory descriptive text. In other implementations, the filter module 166 represents functionality of text generation model 164 itself (e.g., by training text generation model 164 to avoid such language).

In some implementations and/or scenarios, the computing system 104 (or another computing system not shown in FIG. 1) trains the model 160 and/or the model 164. In particular, the training module 154 may train the model 160 and/or the model 164 using training data 168 as described herein. In some implementations, the training data 168 includes data associated with past categorizations, third party information resources, freeform descriptions, etc. In some implementations, the training data 168 includes data provided by content providers similar to content provider 106. In some implementations, training module 154 is included in a computing system other than computing system 104, and computing system 104 only includes or accesses the model 160 and/or the model 164 after the model(s) is/are trained. In some implementations, training machine learning models may produce byproduct weights, or parameters which may be initialized to random values. The weights may be modified as the network is iteratively trained, by using one of several gradient descent algorithms, to reduce loss and to cause the values output by the network to converge to expected (or “learned”) values.

In some implementations, as noted above, the model 160 and/or the model 164 may be a generative AI model, and may have been trained by computing system 104 or another computing system using supervised or semi-supervised learning techniques, using training data of the appropriate modality (e.g., text data). Such generative AI models may be general-purpose models (e.g., trained on a wide array of publicly available datasets such as web pages, documents, etc., available via the Internet) or may be a domain-specific model (e.g., trained or finetuned on custom and/or proprietary datasets, such as documents/data available via one or more intranets). In some implementations, the generative AI models have parameters tuned, via the training process, specifically for high performance in the context of generating text having one or more particular qualities and/or characteristics. In the digital advertising context, for example, the model 160 and/or the model 164 may be trained/tuned to generate categories and/or freeform text descriptions, respectively, with an emphasis on content items and characteristics that users generally find to be helpful, or that generally provide a range of options for a user to select from.

In some implementations, the computing system 104 accesses a remote server/system that provides generative AI as a service (i.e., with at least a portion of the model 160 and/or the model 164 residing at a location remote from the computing system 104). In other implementations, the model 160 and/or the model 164 are local to the computing system 104. Thus, the model 160 and/or the model 164 may reside at the computing system 104 as shown in FIG. 1, or the computing system 104 may access the model 160 and/or the model 164 by communicating with another computing system via the network 110. For example, the model 160 and/or the model 164 may be or include AI models that a remote server makes available to computing systems (including computing system 104) via an application programming interface (API).

The training data 168 may generally include any text data used for training purposes. The training data 168 may include, for example, labeled or unlabeled category data, text summary data, and/or historical data for past categories, text summaries, filtering, and/or other operations as described herein.

The operation of the categorization module 150, the text generation module 152, the training module 154, and their constituent parts, will be discussed in further detail below in connection with various example implementations.

In some implementations, content providers such as content provider 106 hold accounts related to the services provided by the computing system 104. In these implementations, information associated with the accounts may be stored in an account database (not shown in FIG. 1). The account database may be stored in the memory 144 or may be stored in one or more memories that are remote from the computing system 104, for example. The account information may include information such as entity name, subscription level, entity preferences (e.g., brand control preferences), and so on. In some implementations, the account information includes selection parameters (e.g., bid amounts or maximum bid amounts), for use by the content selector 162 in selecting sponsored content for inclusion in search result information resources. Depending on the implementation, the computing system 104 may utilize account information (e.g., one or more constraints as noted above) at different times depending on the implementation. For example, content provider account information may be utilized by categorization module 150 when generating the categories, by text generation module 152 when generating words associated with inline links, and so on.

Figure 2A:
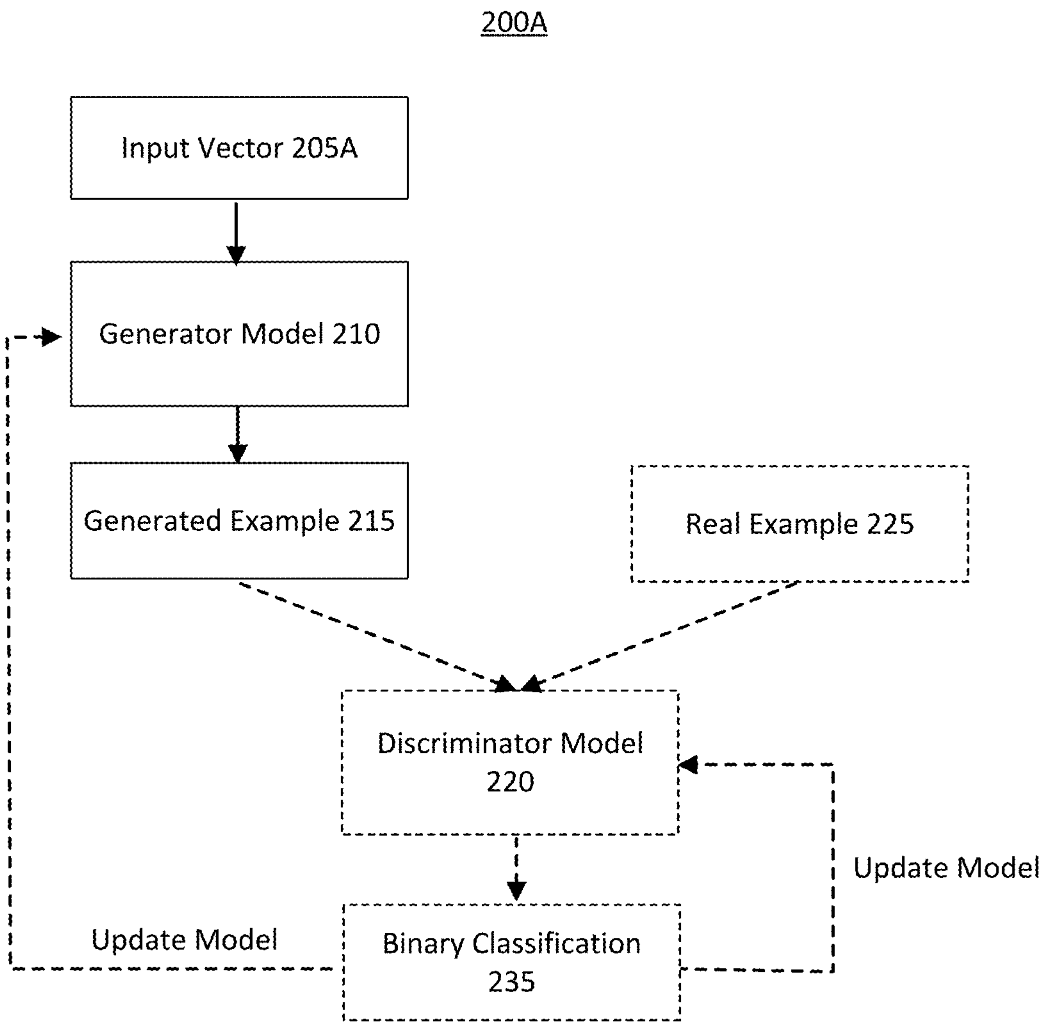
FIG. 2A depicts an example artificial intelligence model that may be implemented in the system of FIG. 1.
Figure 2B:
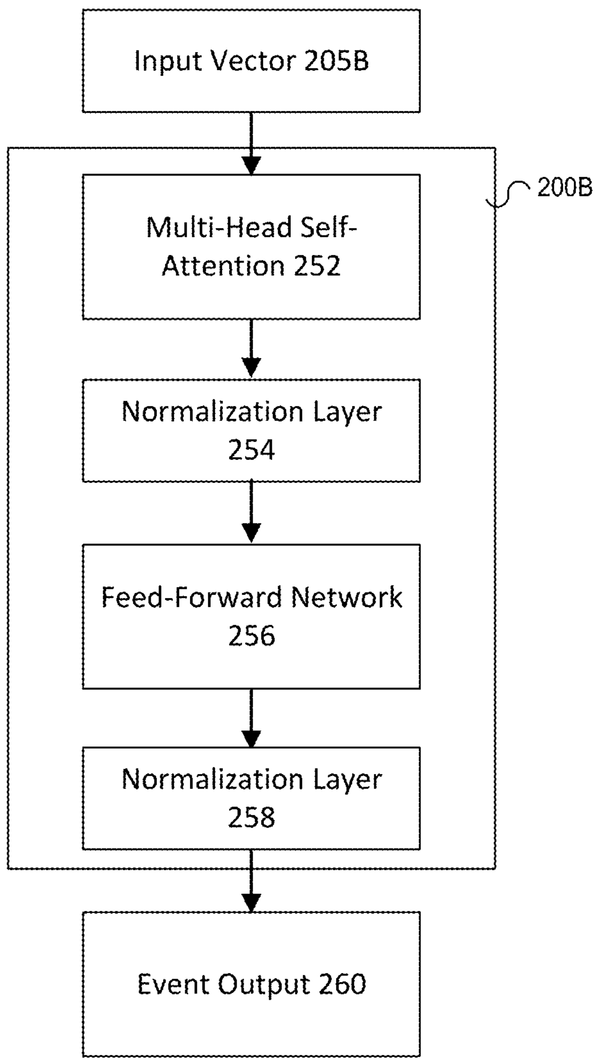
FIG. 2B depicts an example large language model that may be implemented in the system of FIG. 1.

FIGS. 2A and 2B depict exemplary models that may be used (or parts of which may be used) as categorization model 160 or text generation model 164, for example. It is understood, however, that these are just some of a number of suitable AI model types that may be used by computing system 104.

Turning first to FIG. 2A, an exemplary model 200A uses generative AI techniques. The model 200A may be used as categorization model 160, for example. In particular, a generator model 210 and a discriminator model 220 receive inputs to generate a binary classification 235 and output a sequence of words and/or other metrics as described herein. In particular, the generator model 210 receives an input vector 205A to generate a generated example 215. In some implementations, the input vector 205A is a fixed-length random vector. In some implementations, the input vector 205A may be drawn randomly from a Gaussian distribution. Depending on the implementation, the vector space corresponding to the input vector 205A may include one or more hidden variables (e.g., variables that are not directly observable). In some implementations, the input vector 205A is used to seed the generative process. Using the input vector 205A, the generator model 210 then generates a generated example 215.

In some implementations, the discriminator model 220 then receives the generated example 215 or a real example 225. The discriminator model 220 may generate a binary classification 235 inferring/indicating whether the received input is model-generated or real. The exemplary model 200A may additionally output an output product (e.g., one or more categories, a freeform text description, etc.) and/or use the binary classification 235 in training the generator model 210 and/or discriminator model 220.

In still further implementations, the exemplary model 200A uses both the generator model 210 and the discriminator model 220 for training and subsequently uses only the generator model 210 for generative modeling as described herein.

In some implementations, the generator model 210 and the discriminator model 220 are trained according to adversarial techniques (e.g., when the discriminator model 220 correctly generates the binary classification 235, the generator model 210 is updated and, when the discriminator model 220 incorrectly generates the binary classification 235, the discriminator model 220 is updated).

Depending on the implementation, the generator model 210 and/or the discriminator model 220 may be or include neural networks, such as artificial neural networks (ANN), convolution neural networks (CNN), or recurrent neural networks (RNN). In further implementations, the model 200A, the generator model 210, and/or the discriminator model 220 may incorporate, include, be, and/or otherwise use techniques in a manner reminiscent to language model techniques (e.g., an LLM, a bag-of-words model, etc.). Similarly, the model 200A, the generator model 210, and/or the discriminator model 220 may incorporate, include, be, and/or otherwise use a transformer architecture to utilize the appropriate language model techniques, as described with regard to FIG. 2B below.

FIG. 2B illustrates an exemplary LLM 200B, which receives an input vector 205B similar to input vector 205A and provides an output 260. The LLM 200B may be used as text generation model 164, for example. In some implementations, the LLM 200B is initially trained to predict a word in a sequence of words. For example, the LLM 200B may be given a word sequence that leads up to "Today is a," and predict a next word, such as "sunny day", "Saturday", "holiday", etc.

In some implementations, transformers are used to train the LLM 200B (e.g., a generative pre-trained transformer (GPT) model). More specifically, some implementations use a GPT model that includes (i) an encoder that processes the input sequence, and (ii) a decoder that generates the output sequence. The encoder and decoder may both include a multi-head self-attention mechanism that allows the GPT model to differentially weight parts of the input sequence to infer meaning and context (e.g., using metadata in the historical and/or training data), for example.

The input vector 205B may be a vector representative of relationships between words, sequences, etc. in the input. The LLM 200B may include a self-attention block 252 component to attend to different parts of the input simultaneously or near-simultaneously to capture relationships and/or dependencies between the different parts of the input (e.g., referred to as a multi self-attention block, multi-head attention block, multi-head self-attention block, masked multi self-attention block, masked multi-head attention block, masked multi-head self-attention block, etc.). In particular, the self-attention block 252 relates different positions of a sequence to compute a representation of the sequence. As such, the self-attention block 252 may weigh an impact of different words in a sequence when sequencing. As such, the LLM 200B learns to give emphasis to different portions of an input vector 205B.

The self-attention block 252 may then compute an attention score representing the impact of each word in the sentence with respect to the other words in the sentence (e.g., by taking a dot product between different vector sets). The output then proceeds to the normalization layer 254. The normalization layer 254 may normalize the output of the self-attention block 252 (e.g., by applying a softmax function to normalize the scores).

Similarly, the self-attention block 252 may provide output to a feed-forward network block 256, which performs a non-linear transformation to generate a new representation of the input and/or relationships between words, sequences, etc. In particular, the feed-forward network block 256 may compute a weighted sum of the vectors, using the calculated and normalized attention scores to capture the contextual relationships between words. In some implementations, the normalization layer 254 and/or the self-attention block 252 performs the computation to generate a representation of the relationship between words, etc. After the feed-forward network block 256, an additional normalization layer 258 may normalize the respective output and/or add residual connection(s) to allow the output to move directly to another input. The LLM 200B may therefore learn which parts of an input are important (e.g., remain prevalent through the normalization process). Depending on the implementation, the training of LLM 200B may repeat the process any suitable number of times.

Depending on the implementation, an encoder and/or a decoder may be trained as described above. In further implementations, the encoder is trained in accordance with the above, and a decoder includes an additional self-attention block (not shown) receiving the output of the encoder.

Figure 3A:
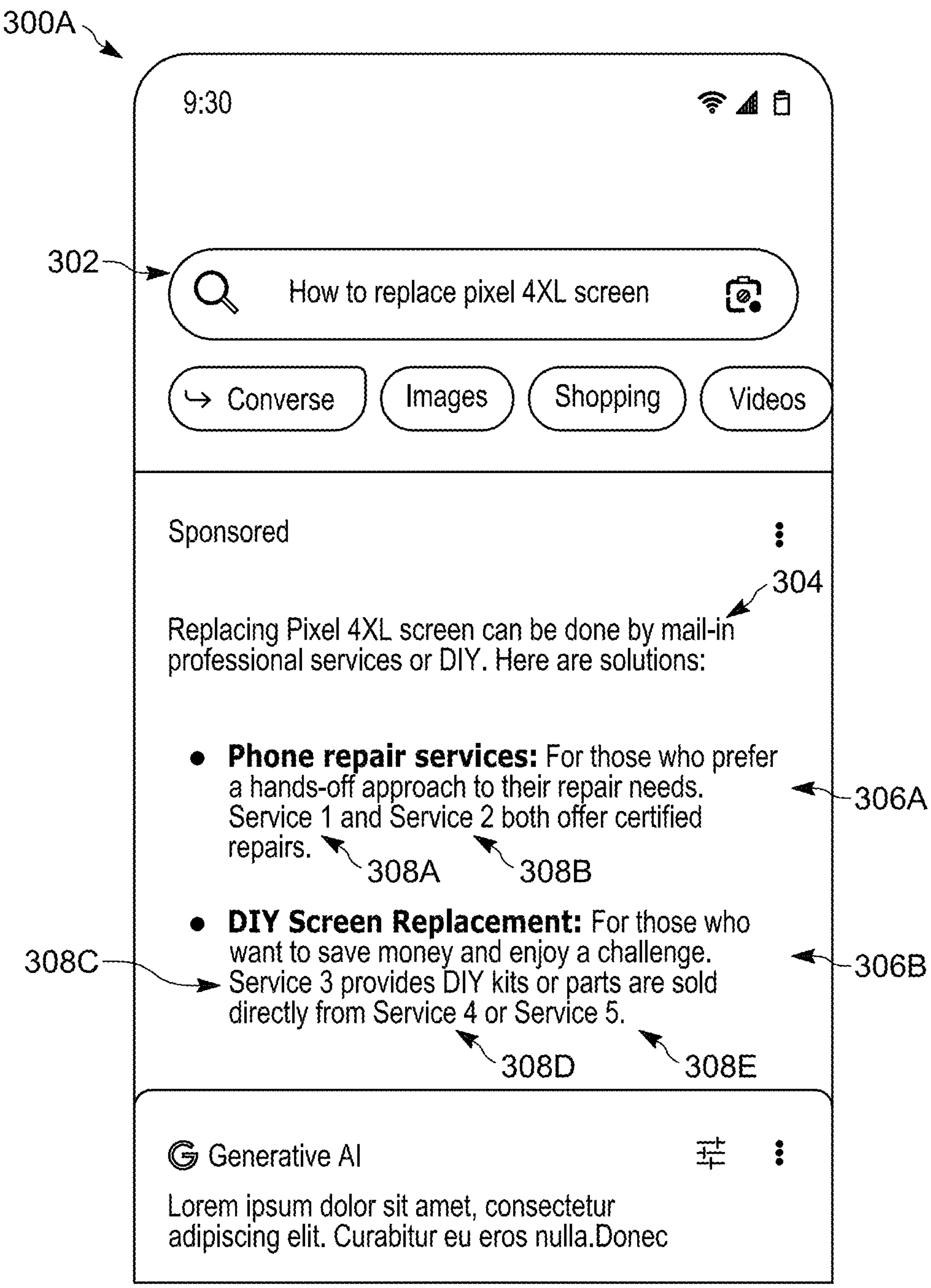
FIG. 3A depicts an example user interface that may be produced in the system of FIG. 1.
Figure 3B:
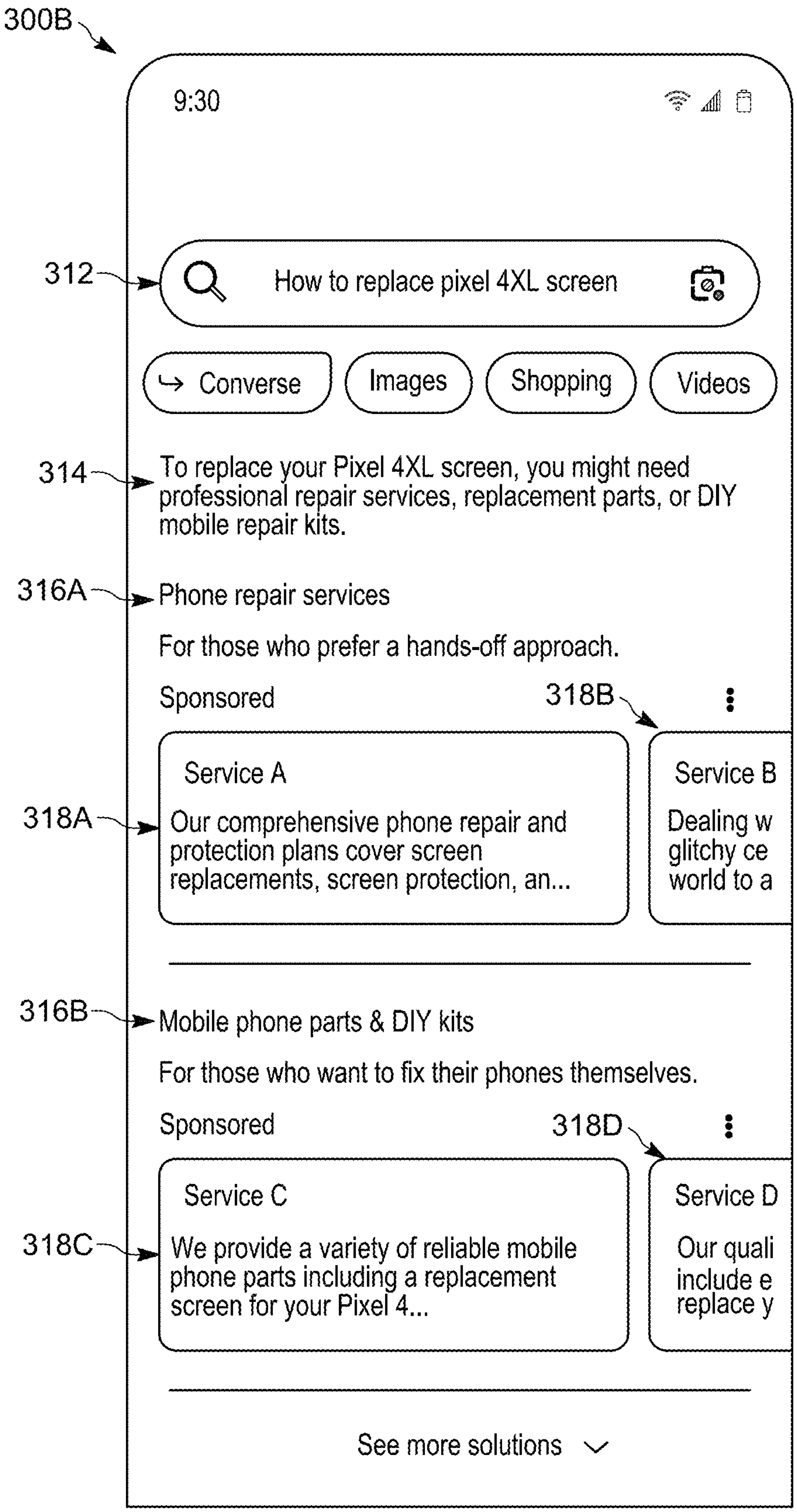
FIG. 3B depicts an alternative example user interface that may be produced in the system of FIG. 1.

FIGS. 3A and 3B depict example user interfaces 300A and 300B that a computing system (e.g., computing system 104 of FIG. 1) may cause a client device (e.g., client device 102) to generate in response to a user search query, according to two different implementations.

In the implementation and scenario of FIG. 3A, the computing system 104 receives (e.g., from client device 102) a search query 302 ("How to replace pixel 4XL screen") and provides, within a "sponsored" section of the user interface 300A, introductory descriptive text 304. The introductory descriptive text 304 may be generated by text generation module 152 based on the search query 302, and possibly other information (e.g., user inputs or other signals, and/or sponsored content options that were selected by content selector 162 based on the search query 302). As seen in FIG. 3A, the user interface 300A also includes two categories generated by categorization module 150: "Phone Repair Services" and "DIY Screen Replacement". These categories may be generated using any of the techniques discussed above in connection with FIG. 1 (e.g., based only on the search query 302, or also based on sponsored content options that were selected by content selector 162 based on the search query 302, etc.).

Text generation module 152 also generates freeform descriptive text 306A and 306B for the two categories, with the freeform descriptive text 306A including links (e.g., URL hyperlinks) 308A and 308B and the freeform descriptive text 306B including links (e.g., URL hyperlinks) 308C, 308D, and 308E. The links 308A-308E correspond to sponsored content options that are selected by content selector 162 using any of the techniques disclosed herein (e.g., based on the search query 302, or based on the categories generated by categorization module 150). The freeform descriptive text 306A and 306B as a whole may be generated using any of the techniques discussed above in connection with FIG. 1 (e.g., based only on the search query 302, or also based on landing pages associated with the sponsored content options, etc.). The text generation module 152 may add the category labels "Phone Repair Services" and "DIY Screen Replacement" as a distinct step from generating the rest of the freeform descriptive text 306A and 306B, or the labels may be produced by text generation model 164 when outputting the rest of the freeform descriptive text 306A and 306B. The freeform descriptive text 306A and 306B, and/or the introductory descriptive text 304, may reflect the output of processing/filtering by filter module 166, as discussed above in connection with FIG. 1.

In the implementation and scenario of FIG. 3B, the computing system 104 receives (e.g., from client device 102) a search query 312 (again, "How to replace pixel 4XL screen") and provides, within a "sponsored" section of the user interface 300B, introductory descriptive text 314. The introductory descriptive text 314 may be generated by text generation module 152 based on the search query 312, and possibly other information (e.g., user inputs or other signals, and/or sponsored content options that were selected by content selector 162 based on the search query 312). As seen in FIG. 3B, the user interface 300B also includes two categories generated by categorization module 150: "Phone Repair Services" and "Mobile phone parts & DIY kits". These categories may be generated using any of the techniques discussed above in connection with FIG. 1 (e.g., based only on the search query 312, or also based on sponsored content options that were selected by content selector 162 based on the search query 312, etc.). In the example shown, text generation module 152 also provides a short snippet of additional introductory descriptive text 316A and 316B for the "Phone Repair Services" and "Mobile phone parts & DIY kits" categories, respectively. The text generation module 152 may add the category labels "Phone Repair Services" and "Mobile phone parts & DIY kits" as a distinct step from generating the rest of the additional introductory descriptive text 316A and 316B, or the labels may be produced by text generation model 164 when outputting the rest of the additional introductory descriptive text 316A and 316B.

Text generation module 152 also generates freeform descriptive text 318A and 318B for the first category, and freeform descriptive text 318C and 318D for the second category, with each of freeform descriptive text elements 318A-318D being dedicated to (i.e., describing only) a particular sponsored content option that was selected by content selector 162. In the example of FIG. 3B, the graphical elements (boxes, shaded areas, etc.) associated with each of the freeform descriptive text elements 318A-318D may be associated with respective URL links (e.g., URL hyperlinks) as discussed above. The freeform descriptive text elements 318A-318D may be generated using any of the techniques discussed above in connection with FIG. 1 (e.g., based on landing pages associated with the sponsored content options, etc.). The freeform descriptive text elements 318A-318D, the additional introductory descriptive text 316A and 316B, and/or the introductory descriptive text 314 may reflect the output of processing/filtering by filter module 166, as discussed above in connection with FIG. 1.

It will be understood that, although FIGS. 3A and 3B depict example scenarios in which the user interfaces show two categories, any suitable number of categories may be included (e.g., one category, three categories, five categories, etc.), with any suitable number of sponsored content options per category.

Figure 4:
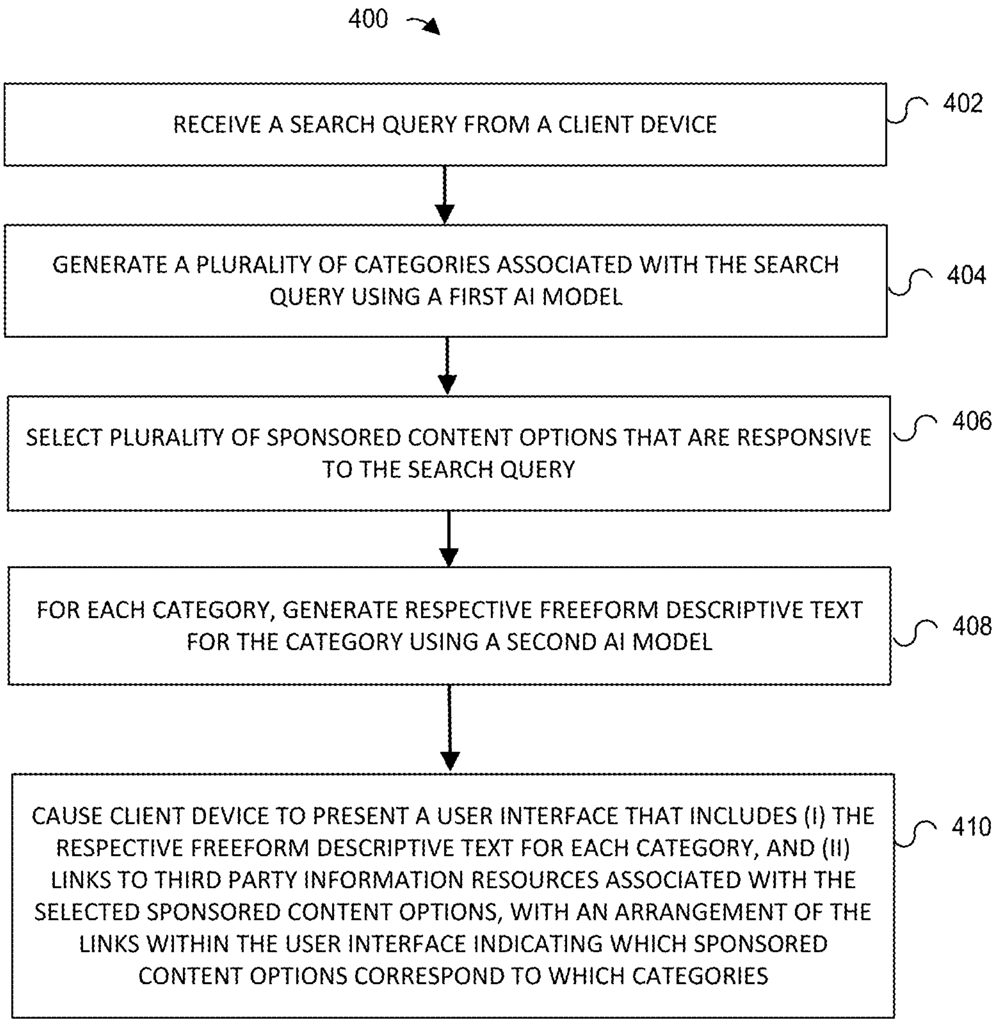
FIG. 4 is a flow diagram of an example method for generating categories, and freeform descriptions associated with links, based on a search query.

FIG. 4 is a flow diagram of an example method 400 for providing information responsive to a user search. The method 400 may be implemented as instructions stored on one or more non-transitory, computer-readable media (e.g., memory 144) and executed by one or more processors in one or more computing devices. For example, the method 400 may be implemented by the processor 142 of the computing system 104 in FIG. 1, when executing instructions of the categorization module 150 and/or text generation module 152. It will be understood that additional, fewer, and/or alternate components may be used to implement the example method 400.

At block 402, the computing system 104 receives a search query from a client device (e.g., client device 102). Depending on the implementation, the search query may be a request from a user device (e.g., entered via a search engine, a database search tool, a local memory search tool, etc.). In some such implementations, the search query can be of any arbitrary length (e.g., a single word, a sentence, etc.). In other implementations, the search query must be within a range of lengths (e.g., above a minimum length, below a maximum length, within a predetermined length range, etc.).

At block 404, the computing system 104 generates a plurality of categories associated with the search query using a first AI model. In some implementations, the first AI model is an LLM or other generative AI model (e.g., categorization model 160). Depending on the implementation, the computing system 104 may generate the categories as commercial categories, usage categories, and/or according to any other suitable delineator. In some implementations, the computing system 104 generates the categories based on a metric indicative of usefulness to the user (e.g., most likely to address the user's query, most likely to provide further resources to a user, most likely to provide a product that matches the user's query, etc.), as predicted by a trained machine learning model of computing system 104 (or another system) or computed using other suitable techniques.

In some implementations, the computing system 104 also or instead, at block 404, uses one or more other types or sources of data to determine categories in which the user may be interested. For example, the computing system 104 may use one or more user account settings, historical data associated with the user (if the user has granted permission to utilize such), anonymized historical data, etc.

At block 406, the computing system 104 selects a plurality of sponsored content options that are responsive to the search query. In some implementations, block 406 includes selecting the plurality of sponsored content options based on the categories determined/generated at block 404. In other implementations, block 406 occurs before block 404, and the categories are generated based on the selected content options (e.g., based on digital advertisements or other content items associated with the selected content options, or based on the content of landing pages or other information resources associated with the selected content options, etc.). Selecting sponsored content options may include selecting particular companies/vendors, selecting particular content items (e.g., particular digital advertisements), selecting particular landing pages, or any other type of selection that indicates particular entities, products, and/or services (or groupings thereof).

At block 408, the computing system 104 generates respective freeform descriptive text for each of the categories using a second AI model (e.g., text generation model 164). For a given category, the freeform descriptive text may be text that can incorporate/reference (in an inline manner) multiple sponsored content options associated with that category (e.g., as in the example of FIG. 3A), or may include separate, dedicated snippets of text for each sponsored content option associated with the category (e.g., as in the example of FIG. 3B).

At block 410, the computing system 104 causes the client device (e.g., client device 102) to present a user interface, e.g., by transmitting data that the client device uses to populate the user interface (e.g., to populate content slots within a results page for a search engine website). The user interface includes the respective freeform descriptive text for each category of the plurality of categories, and also includes links to third party information resources (e.g., landing pages) associated with the selected plurality of sponsored content options. Moreover, an arrangement of the links within the user interface indicates which of the plurality of sponsored content options correspond to which of the plurality of categories. For example, the user interface may have an arrangement similar to user interface 300A or user interface 300B, with links for different sponsored content options being included in sections specific to different categories.

In some implementations, the method 400 includes one or more additional blocks not shown in FIG. 4. For example, the method 400 may include an additional block in which the computing system 104 filters language for the freeform descriptive text to determine modified freeform descriptive text (e.g., detecting one or more promotional words in the language, and/or incorrect, awkward, obscure, or otherwise unintuitive language, or obscene language, etc., and modifying the text to replace the detected word(s)).

As another example, the method 400 may include an additional block in which the computing system 104 verifies the accuracy of the freeform descriptive text. For example, the computing system 104 may compare the freeform descriptive text to one or more third party sources (e.g., authoritative sources, review sources, etc.), and/or receives an indication (e.g., from a user, from an administrator, from another computing device, etc.) of inaccuracy or accuracy and modifies the freeform descriptive text accordingly (and/or uses the feedback to further train or finetune the text generation model 164).

In some implementations, the computing system 104 additionally transmits instructions to display the categories based on a probability metric associated with each category, freeform description, and/or third party information resource. As such, the client device 102 may display the categories to a user in order of relevance, quality of content, a metric associated with usefulness to the user, etc.

Artificial intelligence (AI) is a segment of computer science that focuses on the creation of models that can perform tasks with little to no human intervention. Artificial intelligence systems can utilize, for example, machine learning and computer vision. Machine learning, and its subsets, such as deep learning, focus on developing models that can infer outputs from data. The outputs can include, for example, predictions and/or classifications. Computer vision focuses on analyzing and interpreting images and videos. Artificial intelligence systems can include generative models that generate new content in response to input prompts and/or based on other information.

Example machine-learned models include neural networks or other multi-layer non-linear models. Example neural networks include feed forward neural networks, deep neural networks, recurrent neural networks, and convolutional neural networks. Some example machine-learned models can leverage an attention mechanism such as self-attention. For example, some machine-learned models can include multi-headed self-attention models (e.g., transformer models).

The model(s) can be trained using various training or learning techniques. The training can implement supervised learning, unsupervised learning, reinforcement learning, etc. The training can use techniques such as, for example, backwards propagation of errors. For example, a loss function can be backpropagated through the model(s) to update one or more parameters of the model(s) (e.g., based on a gradient of the loss function). Various loss functions can be used such as mean squared error, likelihood loss, cross entropy loss, hinge loss, and/or various other loss functions. Gradient descent techniques can be used to iteratively update the parameters over a number of training iterations. A number of generalization techniques (e.g., weight decays, dropouts) can be used to improve the generalization capability of the models being trained.

The model(s) can be pre-trained before domain-specific alignment. For instance, a model can be pretrained over a general corpus of training data and fine-tuned on a more targeted corpus of training data. A model can be aligned using prompts that are designed to elicit domain-specific outputs. Prompts can be designed to include learned prompt values (e.g., soft prompts). The trained model(s) may be validated prior to their use using input data other than the training data and may be further updated or refined during their use based on additional feedback/inputs.

In some implementations, the computing system 104 may use one or more the machine learning models noted above to perform any one or more of the operations discussed herein in connection with machine learning.

Although the foregoing text sets forth a detailed description of numerous different aspects and implementations of the invention, it should be understood that the scope of the patent is defined by the words of the claims set forth at the end of this patent. The detailed description is to be construed as exemplary only.

The following additional considerations apply to the foregoing discussion. Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter of the present disclosure.

Unless specifically stated otherwise, discussions in the present disclosure using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used in the present disclosure any reference to "one implementation" or "an implementation" means that a particular element, feature, structure, or characteristic described in connection with the implementation is included in at least one implementation or implementation. The appearances of the phrase "in one implementation" in various places in the specification are not necessarily all referring to the same implementation.

As used in the present disclosure, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present), and B is false (or not present), A is false (or not present) and B is true (or present), and both A and B are true (or present).

Upon reading this disclosure, those of skill in the art will appreciate still additional alternative structural and functional designs through the principles described herein. Thus, while particular implementations and applications have been illustrated and described, it is to be understood that the disclosed implementations are not limited to the precise construction and components disclosed in the present disclosure. Various modifications, changes, and variations, which will be apparent to those skilled in the art, may be made in the arrangement, operation and details of the method and apparatus disclosed in the present disclosure without departing from the spirit and scope defined in the appended claims.

What is claimed is:

1. A computer-implemented method for providing information responsive to a user search, the method comprising:

receiving, by one or more processors of a computing system, a search query from a client device;

generating, by the one or more processors, a plurality of categories associated with the search query using a first artificial intelligence (AI) model;

selecting, by the one or more processors, a plurality of sponsored content options that are responsive to the search query;

for each category of the plurality of categories, generating, by the one or more processors, respective freeform descriptive text for the category using a second AI model; and causing, by the one or more processors, the client device to present a user interface that includes (i) the respective freeform descriptive text for each category of the plurality of categories, and (ii) links to third party information resources associated with the selected plurality of sponsored content options, wherein an arrangement of the links within the user interface indicates which of the plurality of sponsored content options correspond to which of the plurality of categories.

2. The computer-implemented method of claim 1, wherein for each category of the plurality of categories, the links to the third party information resources are included inline with the respective freeform descriptive text.

3. The computer-implemented method of claim 1, further comprising:

retrieving, by the one or more processors and for each category of the plurality of categories, text associated with the third party information resources from one or more databases, wherein generating the respective freeform descriptive text is based at least in part on the text associated with the third party information resources.

4. The computer-implemented method of claim 1, further comprising:

generating, by the one or more processors, introductory descriptive text for each category of the plurality of categories, wherein the user interface includes the introductory descriptive text for each category.

5. The computer-implemented method of claim 4, wherein generating the introductory descriptive text includes using a third AI model to generate the introductory descriptive text.

6. The computer-implemented method of claim 1, wherein generating the respective freeform descriptive text includes filtering language of the respective freeform descriptive text.

7. The computer-implemented method of claim 6, wherein filtering the language of the respective freeform descriptive text includes:

detecting one or more promotional words in the language; and modifying the respective freeform descriptive text to replace the detected one or more promotional words with one or more neutral words.

8. The computer-implemented method of claim 1, wherein the first AI model includes a first large language model (LLM) and the second AI model includes a second LLM.

9. A computing system comprising:

one or more processors; and a computer-readable medium storing instructions that, when executed, cause the one or more processors to:

receive a search query from a client device;

generate a plurality of categories associated with the search query using a first artificial intelligence (AI) model;

select a plurality of sponsored content options that are responsive to the search query;

for each category of the plurality of categories, generate respective freeform descriptive text for the category using a second AI model; and cause the client device to present a user interface that includes (i) the respective freeform descriptive text for each category of the plurality of categories, and (ii) links to third party information resources associated with the selected plurality of sponsored content options, wherein an arrangement of the links within the user interface indicates which of the plurality of sponsored content options correspond to which of the plurality of categories.

10. The computing system of claim 9, wherein for each category of the plurality of categories, the links to the third party information resources are included inline with the respective freeform descriptive text.

11. The computing system of claim 9, wherein the computer-readable medium stores further instructions that, when executed, cause the one or more processors to:

retrieve, for each category of the plurality of categories, text associated with the third party information resources from one or more databases, wherein generating the respective freeform descriptive text is based at least in part on the text associated with the third party information resources.

12. The computing system of claim 9, wherein the computer-readable medium stores further instructions that, when executed, cause the one or more processors to:

generate introductory descriptive text for each category of the plurality of categories, wherein the user interface includes the introductory descriptive text for each category.

13. The computing system of claim 12, wherein generating the introductory descriptive text includes using a third AI model to generate the introductory descriptive text.

14. The computing system of claim 9, wherein generating the respective freeform descriptive text includes filtering language of the respective freeform descriptive text.

15. The computing system of claim 14, wherein filtering the language of the respective freeform descriptive text includes:

detecting one or more promotional words in the language; and modifying the respective freeform descriptive text to replace the detected one or more promotional words with one or more neutral words.

16. The computing system of claim 9, wherein the first AI model includes a first large language model (LLM) and the second AI model includes a second LLM.

17. A non-transitory computer-readable medium storing instructions that, when executed by one or more processors of a computing system, cause the one or more processors to:

receive a search query from a client device;

generate a plurality of categories associated with the search query using a first artificial intelligence (AI) model;

select a plurality of sponsored content options that are responsive to the search query;

for each category of the plurality of categories, generate respective freeform descriptive text for the category using a second AI model; and cause the client device to present a user interface that includes (i) the respective freeform descriptive text for each category of the plurality of categories, and (ii) links to third party information resources associated with the selected plurality of sponsored content options, wherein an arrangement of the links within the user interface indicates which of the plurality of sponsored content options correspond to which of the plurality of categories.

18. The non-transitory computer-readable medium of claim 17, wherein for each category of the plurality of categories, the links to the third party information resources are included inline with the respective freeform descriptive text.

19. The non-transitory computer-readable medium of claim 17, wherein the non-transitory computer-readable medium stores further instructions that, when executed by the one or more processors, cause the one or more processors to:

retrieve, for each category of the plurality of categories, text associated with the third party information resources from one or more databases, wherein generating the respective freeform descriptive text is based at least in part on the text associated with the third party information resources.

20. The non-transitory computer-readable medium of claim 17, wherein the non-transitory computer-readable medium stores further instructions that, when executed by the one or more processors, cause the one or more processors to:

generate introductory descriptive text for each category of the plurality of categories, wherein the user interface includes the introductory descriptive text for each category.

* * * * *